(12) United States Patent
Tally et al.

(10) Patent No.: US 11,772,008 B2
(45) Date of Patent: *Oct. 3, 2023

(54) WATER TREATMENT SYSTEM AND METHOD OF USE THEREOF

(71) Applicant: Renew Health Ltd, Farmington Hills, MI (US)

(72) Inventors: William Tally, Milford, MI (US); Dereck Kowalski, Macomb, MI (US); Brian McCann, Hawthorne, CA (US)

(73) Assignee: Renew Health Ltd, Macpherson (SG)

( * ) Notice: Subject to any disclaimer, the term of this patent is extended or adjusted under 35 U.S.C. 154(b) by 0 days.

This patent is subject to a terminal disclaimer.

(21) Appl. No.: 16/495,306

(22) PCT Filed: Mar. 19, 2018

(86) PCT No.: PCT/US2018/023055
§ 371 (c)(1),
(2) Date: Sep. 18, 2019

(87) PCT Pub. No.: WO2018/175275
PCT Pub. Date: Sep. 27, 2018

(65) Prior Publication Data
US 2020/0094159 A1    Mar. 26, 2020

Related U.S. Application Data

(60) Provisional application No. 62/473,479, filed on Mar. 19, 2017.

(51) Int. Cl.
*C02F 1/04*        (2023.01)
*B01D 1/28*        (2006.01)
(Continued)

(52) U.S. Cl.
CPC ............... *B01D 3/10* (2013.01); *B01D 1/28* (2013.01); *C02F 1/041* (2013.01); *C02F 1/048* (2013.01); *C02F 1/06* (2013.01); *B01D 3/42* (2013.01); *C02F 2103/08* (2013.01); *C02F 2209/03* (2013.01); *C02F 2209/05* (2013.01);
(Continued)

(58) Field of Classification Search
CPC ... B01D 1/06; B01D 1/08; B01D 1/10; B01D 1/12; B01D 1/28–2896; B01D 3/10; C02F 1/041

See application file for complete search history.

(56) References Cited

U.S. PATENT DOCUMENTS 2,449,587 A * 9/1948 Chambers ................ B01D 1/16
                                                              202/237
2,696,465 A * 12/1954 Kittredge ................ B01D 1/12
                                                              202/185.1
(Continued)

OTHER PUBLICATIONS

"Centrifugal Superchargers", Oct. 19, 2015 (date obtained via Wayback Machine), ProCharger.com, URL: https://web.archive.org/web/20151019025700/https://www.procharger.com/centrifugal-supercharger (Year: 2015).*

(Continued)

*Primary Examiner* — Jonathan Luke Pilcher
(74) *Attorney, Agent, or Firm* — OAKLAND LAW GROUP PLLC; Robert Moir (57) ABSTRACT

The disclosure relates to systems for treating water and method for use.

8 Claims, 11 Drawing Sheets

(51) Int. Cl.
    *B01D 3/10*           (2006.01)
    *C02F 1/06*           (2023.01)
    *B01D 3/42*           (2006.01)
    *C02F 103/08*       (2006.01)

(52) U.S. Cl.
    CPC ....... *C02F 2209/06* (2013.01); *C02F 2209/11* (2013.01); *C02F 2209/40* (2013.01); *C02F 2209/42* (2013.01)

(56) References Cited

U.S. PATENT DOCUMENTS

| | | | |
|---|---|---|---|
| 3,425,235 A | 2/1969 | Cox | |
| 3,627,032 A | 12/1971 | Glad | |
| 3,674,652 A | 7/1972 | Brown | |
| 3,748,234 A * | 7/1973 | Pottharst, Jr. | B01D 1/289 |
| | | | 202/187 |
| 3,930,960 A * | 1/1976 | Taylor | B01D 1/2887 |
| | | | 202/187 |
| 3,956,072 A * | 5/1976 | Huse | B01D 1/289 |
| | | | 202/177 |
| 4,260,461 A * | 4/1981 | Pottharst, Jr. | B01D 1/10 |
| | | | 202/176 |
| 4,444,675 A * | 4/1984 | Goeldner | C02F 1/042 |
| | | | 203/7 |
| 4,696,718 A | 9/1987 | Lasater | |
| 4,769,113 A * | 9/1988 | Sears | B01D 1/221 |
| | | | 159/24.2 |
| 4,938,868 A | 7/1990 | Nelson | |
| 4,985,122 A | 1/1991 | Spencer | |
| 5,145,585 A | 9/1992 | Coke | |
| 5,176,837 A | 1/1993 | Dietrick | |
| 5,338,456 A | 8/1994 | Stivers | |
| 5,441,606 A | 8/1995 | Schlesinger | |
| 5,531,865 A | 7/1996 | Cole | |
| 5,772,850 A * | 6/1998 | Morris | B01D 1/12 |
| | | | 159/24.2 |
| 6,294,054 B1 | 9/2001 | Sutter | |
| 6,332,979 B1 | 12/2001 | Stettens | |
| 6,387,540 B1 | 5/2002 | Yoshidomi | |
| 6,436,242 B1 * | 8/2002 | Sanchez Belmar | B01D 1/2818 |
| | | | 202/182 |
| 6,926,808 B2 | 8/2005 | Shen | |
| 6,932,889 B1 | 8/2005 | Holcomb | |
| 7,250,223 B2 | 7/2007 | Miyachi | |
| 8,226,799 B1 | 7/2012 | Young | |
| 8,986,509 B2 * | 3/2015 | Batty | B01D 5/0039 |
| | | | 203/3 |
| 10,584,041 B2 * | 3/2020 | Tally | C02F 1/004 |
| 2005/0051418 A1 * | 3/2005 | Lama | C02F 1/048 |
| | | | 203/21 |
| 2010/0200388 A1 | 8/2010 | Ward | |
| 2018/0265377 A1 * | 9/2018 | Tally | A01K 79/02 |
| 2020/0207641 A1 * | 7/2020 | Tally | A01K 79/02 |

OTHER PUBLICATIONS

International Report on Patentability for PCT/US2016/049206, dated Nov. 14, 2016.
International Report on Patentability for PCT/US2018/023055, dated Oct. 24, 2019.
Extended European Search Report, Patent Application No. 16840246.9, dated Feb. 13, 2019.
Sao et al., A new multi-effect desalination system with heat pipes by falling film evaporation in the vacuum. Desalination and Water Treatment. 10:306-310. Published online Aug. 3, 2012.

* cited by examiner

WATER TREATMENT SYSTEM AND METHOD OF USE THEREOF

CROSS-REFERENCE TO RELATED APPLICATIONS

This application is a national stage entry, filed under 35 U.S.C. § 371, of International Patent Application PCT/US2018/023055, filed Mar. 19, 2018, which claims the benefit of U.S. provisional application Ser. No. 62/473,479 filed Mar. 19, 2017, each of which are incorporated by reference in their entirety.

BACKGROUND

In many situations, a source of water may be accessible, but the water may not be suitable for human consumption, for agricultural purposes or for other purposes. For example, many individuals have access to salinated water, such as seawater or brackish water, but salinated water cannot be consumed or may not be used for many other purposes. In addition, wastewater is often generated during human use, agricultural or industrial applications and it would be advantageous to purify and reuse or recycle this water for a variety of purposes.

However, the resources to construct and maintain a large water purification facility with associated infrastructure and personnel may not be available in these or other situations. In fact, a portable water purification system may be more desirable in particular situations where the system may be transported, deployed or maintained, perhaps by a relatively small number of people. Further, the use of smaller, more portable systems may be cheaper or more energy-efficient situations. For example, small isolated populations may have access to seawater or non-potable freshwater but no way to purify the water.

Consequently, there is a need for a water purification system that may be used in variety of situations where the system is relatively easy to deploy, relatively easy to maintain, which uses a relatively small amount of energy or which may be able to be transported to different areas with little difficulty. The present disclosure relates to a water purification system that is portable, that is simple to operate and to maintain, has a relatively small footprint but still delivers a high volume of product water.

SUMMARY

The disclosure relates to devices for purifying water and a method for using the devices where the device includes a tank, at least one heat exchanger and at least one vacuum chamber.

DETAILED DESCRIPTION

It is to be understood that the disclosed examples that follow are merely exemplary and specific details disclosed herein are not to be interpreted as limiting, but merely as a basis for the claims and as a representative basis for teaching one skilled in the art. The systems and methods described herein are not limited in their application to the details of construction and the arrangement of components set forth in the description or illustrated in the drawings. Also, the phraseology and terminology used herein is for the purpose of description and should not be regarded as limiting. The use of "including", "comprising", "having", "containing", "involving" and variations thereof herein, is meant to encompass the items listed thereafter, equivalents thereof, and additional items, as well as alternate examples consisting of the items listed thereafter exclusively.

The present disclosure relates generally to the purification of water. The disclosure describes systems where a source water is inputted, placed or flowed into a system and a product water results after treatment with the system. According to the disclosure, the described systems cause the transition of a source water from a liquid state to a gas (vapor) state. In preferred examples, a vapor state is drawn off and then transitioned back to a liquid state, forming a product water. The resulting product water may be of sufficient purity or quality to be used for human consumption, for agricultural purposes or for other purposes. That is, systems of the disclosure may reduce the presence of one or more soluble or insoluble substances in the source water, resulting in an acceptable product water. For example, treatment of a source water with systems of the disclosure may result in a product water that has reduced concentrations of organic or inorganic compounds compared to the source water. The product water may have reduced concentrations of water-soluble compounds compared to the source water. The product water may have reduced concentrations of ions, reduced concentrations of minerals, reduced concentration of metals, reduce concentrations of salts, or reduced concentrations of charged compounds. In preferred examples, systems of the disclosure may reduce the concentration of ions, salts, minerals, charged compounds, neutral compounds, inorganic compounds, organic compounds and combinations thereof. In preferred examples, systems of the disclosure may reduce one or substances such that the product water meets community or regulatory standards for human consumption. For example, the product water may have, without limitation, acceptable levels of lone or more of lead, mercury, arsenic, heavy metals, aluminum, manganese, magnesium, or pharmaceutical metabolites.

According to the disclosure, a source water may be derived from a variety of sources. For example, the system may be used to treat or purify wastewater recovered from residential, commercial, industrial or agricultural applications. In preferred examples, the source water may be salinated water, including seawater or brackish water, where one least goal is to reduce salinity of the source water. For example, it may be required to reduce salinity for human or animal consumption. In some examples, the product water may be sufficiently pure for agricultural purposes such as irrigation.

In some examples, product water resulting from treatment with a first system may serve as a source water for further treatment. For example, in some examples, product water may be passed to a second system (or third system or fourth system or more than four systems) where the product water becomes the source water for additional treatment. In additional examples, the product water may be routed to the first system such that a product water from a first treatment may be the source water for a second treatment with the same system.

In preferred examples, the water treatment system may be connected with other devices that may be used to treat source water. For example, the system may be connected with a water filtration system where the filtration system may be used to filter the source water before or after treatment with a system of the disclosure. Filtration may remove insoluble material, including, for example, particulate or otherwise insoluble matter. Filtration may also be designed to decrease the concentration of one or more soluble components of the source water.

In preferred examples, a system of the disclosure is portable. In preferred examples, a system according to the disclosure may be transported and deployed without disassembly or assembly. That is, systems of the disclosure may be deployed quickly and easily. In some examples, the water treatment system may be mounted on a mode of transportation, such as a truck, car, railroad car or ship. In some examples, a system of the disclosure may be used while mounted on a mode of transport. For example, one or, more systems may be mounted on a pick-up truck while in use. In further examples, one or more systems of the disclosure may be mounted on a boat, ship or barge.

The system may assume a range of dimensions and weights depending on requirements. In preferred examples, systems of the disclosure may weigh from about 400 pounds to about 6000 pounds. In preferred examples, systems of the disclosure weigh from about 500 pounds to about 3000 pounds. In preferred examples, the system weighs about 1000 to about 2000 pounds.

In preferred examples, a system according to the disclosure is from about 40 inches to about 100 inches in width, about 30 to about 200 inches in length and about 40 to about 200 inches in height. In preferred examples, a system of the disclosure is about 72 inches wide by 72 inches in length and about 100 inches in height.

Per the examples, a system of the disclosure may include a tank, at least one array of heat exchangers, a vacuum source and a vacuum chamber.

Per the disclosure, the tank includes at least one chamber, or at least two chambers or at least three chambers. In preferred examples, the tank includes at least one vacuum chamber. In preferred examples, the vacuum chamber is located within the tank, generally above the at least one array of heat exchangers. The volume of the vacuum chamber may be from about 5% to about 60% of the total volume of the tank or the vacuum chamber may be from about 10% to about 50% of the total volume of the tank. In preferred examples, the vacuum chamber volume may be from about 10% to 30% of the volume of the tank.

In preferred examples, the tank includes a second chamber. The second chamber may be placed below the vacuum chamber in preferred examples. The at least one array of heat exchangers may be placed within the second chamber.

The water treatment system includes at least one vacuum source where the at least one vacuum source reduces the air pressure within the vacuum chamber to below one atmosphere. The vacuum source may be, for example and without limitation, superchargers or vacuum pumps. In preferred examples, the vacuum source is a supercharger. In preferred examples, the vacuum source may be mounted securely to the water system such as, for example, securely attached to the tank. In further examples, the at least one vacuum source may be separate from the system. In additional examples, at least one vacuum source may be mounted on the system and at least one vacuum source may be separate from the system.

In preferred examples, the vacuum source generates a pressure of less than atmospheric pressure in the vacuum chamber. For example, the pressure in the vacuum chamber may be from about 0.75 atmospheres to 0.99 atmospheres. In further examples, the vacuum source generates a pressure of from about 0.90 to about 0.99 atmospheres or from about 0.92 to about 0.99 atmospheres. In preferred examples. In particularly preferred examples, the atmospheric pressure is from about 0.92 to about 0.97 atmospheres.

In preferred examples, a system according to the disclosure includes at least one array of heat exchangers. According to the disclosure, the at least one array is positioned within the tank. In preferred examples, the at least one array of heat exchangers is positioned such that lumens of the heat exchangers are in communication with the vacuum chamber.

In preferred examples, the heat exchangers have a central lumen that extends the length of the heat exchanger. According to the disclosure, the heat exchangers may assume any shape or combination of shapes that allow the arrangement or packing of heat exchangers into an array. In preferred examples, the heat exchangers may be cylindrical in shape, may be cuboid or may be some combination of these shapes. The heat exchangers may be helical.

In preferred examples, each heat exchanger may be from about 10 inches to about 40 inches in length. A heat exchanger within an array may be from about 15 inches to about 30 inches. In preferred examples, a heat exchanger in the array may be from about 20 to 25 inches in length.

In preferred examples, the heat exchangers are formed from copper, stainless steel, aluminum or titanium or combinations of these materials. In preferred examples, the heat exchangers are spaced evenly in the array such that each heat exchanger is equidistant from adjacent heat exchangers. In other examples, the heat exchangers may be spaced in different patterns. In further examples, the system may have two arrays of heat exchangers, or three arrays of heat exchangers or more than three arrays of heat exchangers The arrays may be positioned within the tank to meet requirements of a particular situation. For example, the arrays may be arranged such that there is a gap or space between arrays.

According to preferred examples, the heat exchangers are positioned in the array to maximize the surface area of heat exchangers that are in contact with source water. In some examples, this arrangement maximizes the amount of heat transfer to the source water, thereby facilitating the transition of the source water to a vapor state. In preferred examples, the use of heat exchangers reduces the amount of heat required from the heating element. In preferred examples, the temperature of the system is monitored, and the output of the heating element is increased or decreased as required.

According to the disclosure, the at least one array includes at least two heat exchangers, at least three heat exchangers, at least four heat exchangers or at least five heat exchangers. In preferred examples, the array includes from about 2 to about 3000 heat exchangers, or from about 20 to about 2000 heat exchangers or from about 200 to 2000 heat exchangers. In preferred examples, an array of heat exchangers has about 500 to about 2000 heat exchangers. In preferred examples, a system according to the disclosure has from about 800 to about 1200 heat exchangers. In other examples, the array includes from about 100 to about 500 heat exchangers, or from about 200 to about 500 heat exchangers or from about 300 to 500 heat exchangers.

In a particularly preferred example, a system has about 1034 heat exchangers. In preferred examples, the heat exchangers are spaced such that the center of the lumens of the heat exchangers are about 0.3 inches to about 2.0 inches apart. In a particularly preferred example, the heat exchangers are spaced such that the center of the lumens of the heat exchangers are about 1.0 inches apart. In preferred examples, the heat exchangers are from about 10 inches to 36 inches or from about 15 inches to about 30 inches. In particularly preferred examples, the heat exchanger is about 22 to about 25 inches in length.

In preferred examples, heat exchangers are arranged vertically within the tank such that source water flows or is pumped through the lumen of the heat exchangers to the vacuum chamber. In particularly preferred examples, the source water is pumped into the tank and rises in a generally vertical direction, through the lumens of heat exchangers, to the vacuum chamber.

In preferred examples, the water treatment system includes at least one element to heat the water in the tank. In preferred examples, the at least one element is an electric element where electricity supplied to the element heats the element. The electric element may be powered by renewable energy sources, for example, by solar energy. In other examples, the source water may be heated directly by solar energy.

According to preferred examples, the system is monitored and controlled by at least one electronic controller. For example, the flow of source water into the system may be monitored and regulated. Flow rate may be detected by a flow meter connected to the controller. The controller may then regulate flow by directing the actuation of a valve, resulting in a decrease or an increase in flow rate of source water to the system. The at least one controller may also activate, inactivate or modulate one or more pumps to regulate flow rate. In preferred examples, the water level in the system may be monitored and the controller may increase or decrease flow rate to adjust or maintain water level.

Systems according to the disclosure may also include air pressure sensors to monitor the air pressure within the vacuum chamber. The at least one electronic controller may regulate air pressure in the vacuum chamber by increasing or decreasing the activity of the at least one supercharger.

In preferred examples, systems per the disclosure may include components that monitor and test product water quality. In some examples, selected parameters may be monitored in real time with appropriate sensors. For example, and without limitation, pH, turbidity and salinity may be monitored in real time to assess operation of the system. In other examples, product water samples may have been tested separately from the system.

In further examples, the system may include a condensing unit external to the tank of the system such that liquid and vapor flow from the system to the external condensing unit. Condensation of water vapor may be completed in the external unit.

Figure 1:
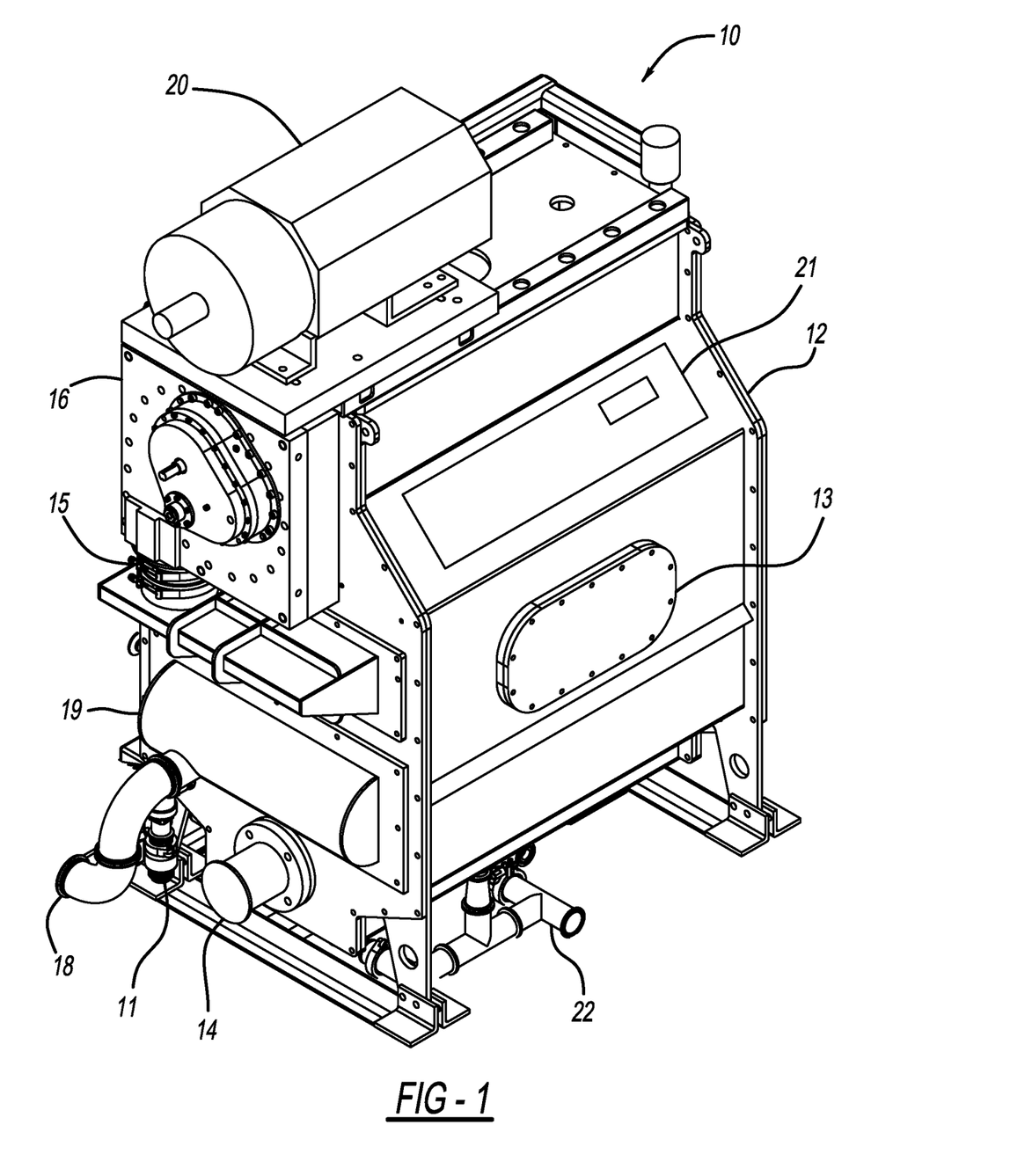
FIG. 1 shows a perspective view of a water treatment system of the disclosure

FIGS. 1 to 11 illustrate various views of examples of water treatment systems following the disclosure. FIG. 1 shows a perspective view from one side of an example of a system. The system includes pipe 11 for introducing a source water into the system. The system 10 has a tank 12. In this example, a single heating element 14 is positioned at the bottom of the tank 12. In additional examples, there may more than heating element placed at one or more locations in this system. In this example a vacuum source 16, is shown, a supercharger is present. In this example, pipe 15 carries water liquid and vapor form vacuum chamber (not shown in this Figure). Motor 20 is also present in this example. In addition, this example shows drain 22, for draining wastewater from the system. In this example, there is a collector 19 that accumulates or collects water before entering pipe 18. FIG. 1 also shows pipe 18 that receives product water in liquid or vapor form after treatment in the system 10. Also, viewing window 13 is shown. Controller/monitor 21 is also shown.

Figure 2:
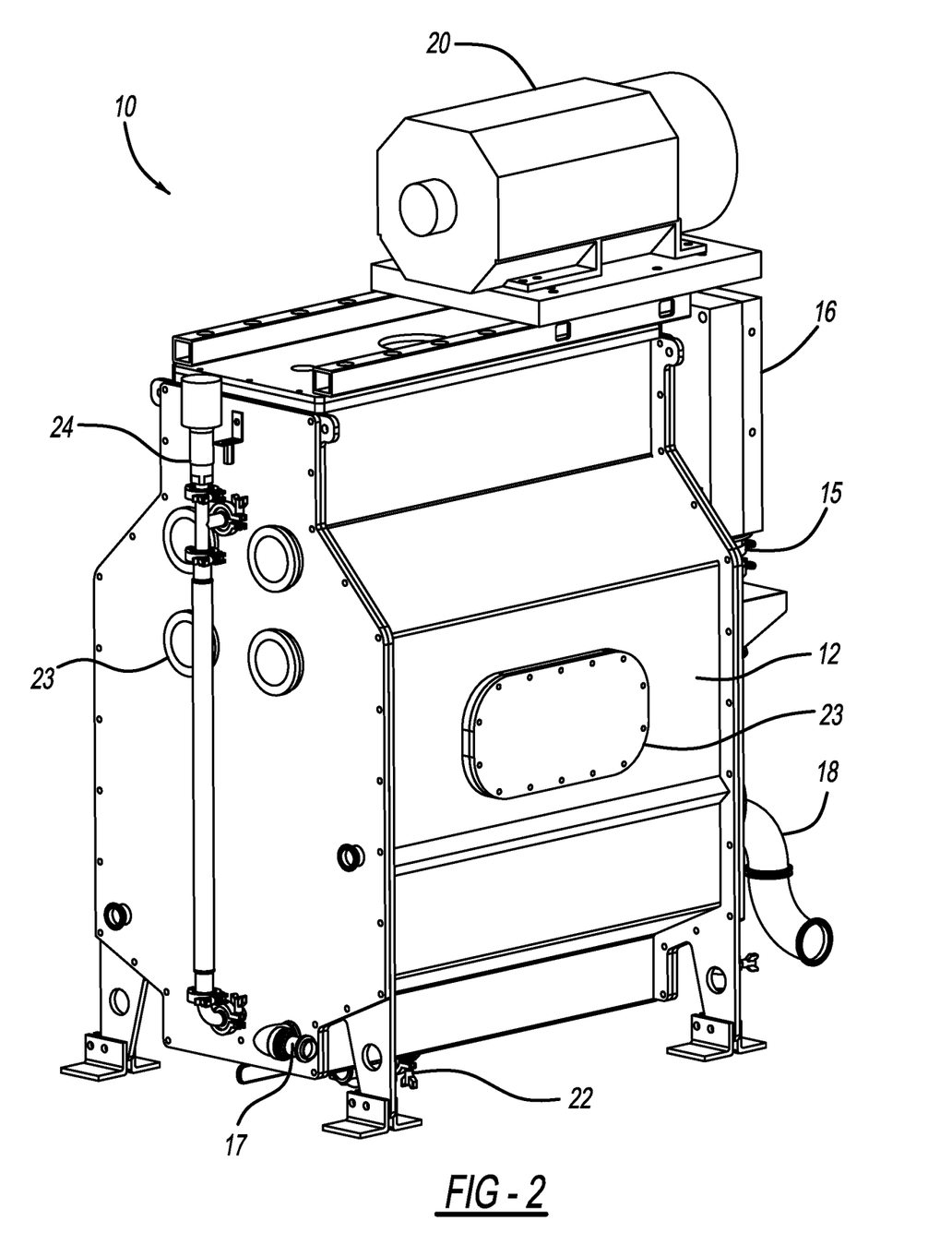
FIG. 2 shows a perspective view of a water treatment system of the disclosure

FIG. 2 shows a perspective view of an example of a system 10 according to the disclosure as viewed from the other side as FIG. 1. The system in this example includes pipe 11 for introducing a source water into the system. In this example, a single heating element 14 is positioned at the bottom of the tank 12. In this example a vacuum source 16, is shown, a supercharger is present. In this example, pipe 15 carries water liquid and vapor from vacuum chamber within the tank (not shown in this Figure). Motor 20 is also present in this example. In addition, this example shows drain 22, for draining wastewater from the system. In this example, there is a collector 19 that accumulates or collects water before entering pipe 18. This view also includes a visual sight 24 for observing the water level in the tank. Also, viewing window 23 is shown as well as drain 17.

Figure 3:
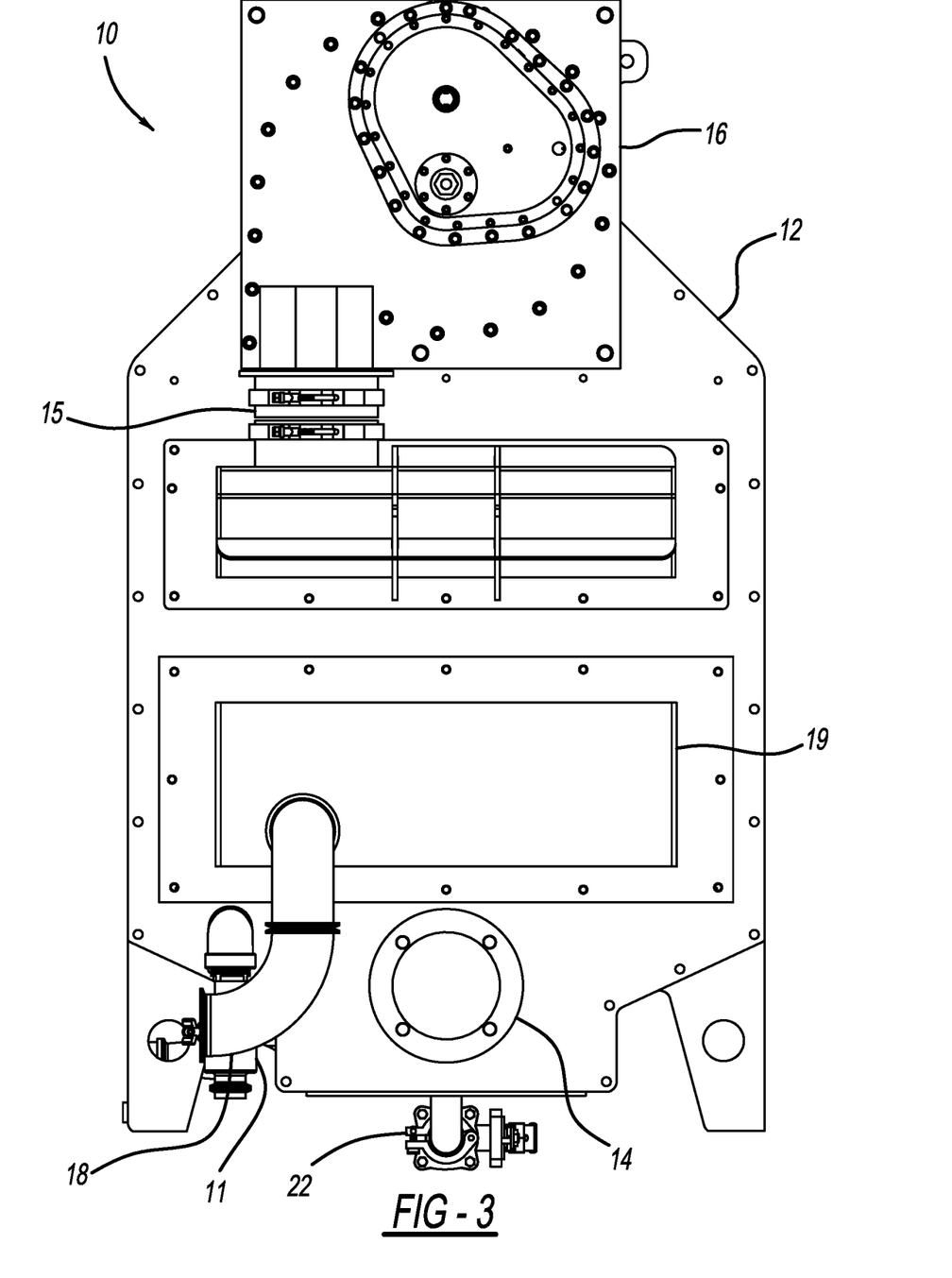
FIG. 3 shows one side of water treatment system of the disclosure

FIG. 3 shows a view of an example of a system 10 according to the disclosure from one side. This example includes pipe 11 for introducing a source water into the system 10. In this example, a single heating element 14 is positioned at the bottom of the tank 12. A vacuum source 16, is shown, a supercharger in this example, is present. In this example, pipe 15 carries water liquid and vapor form vacuum chamber (not shown in this Figure). In addition, this example shows drain 22, for draining wastewater from the system. In this example, there is a collector 19 that accumulates or collects water before entering pipe 18. Pipe 18 carries the source water from the system.

Figure 4:
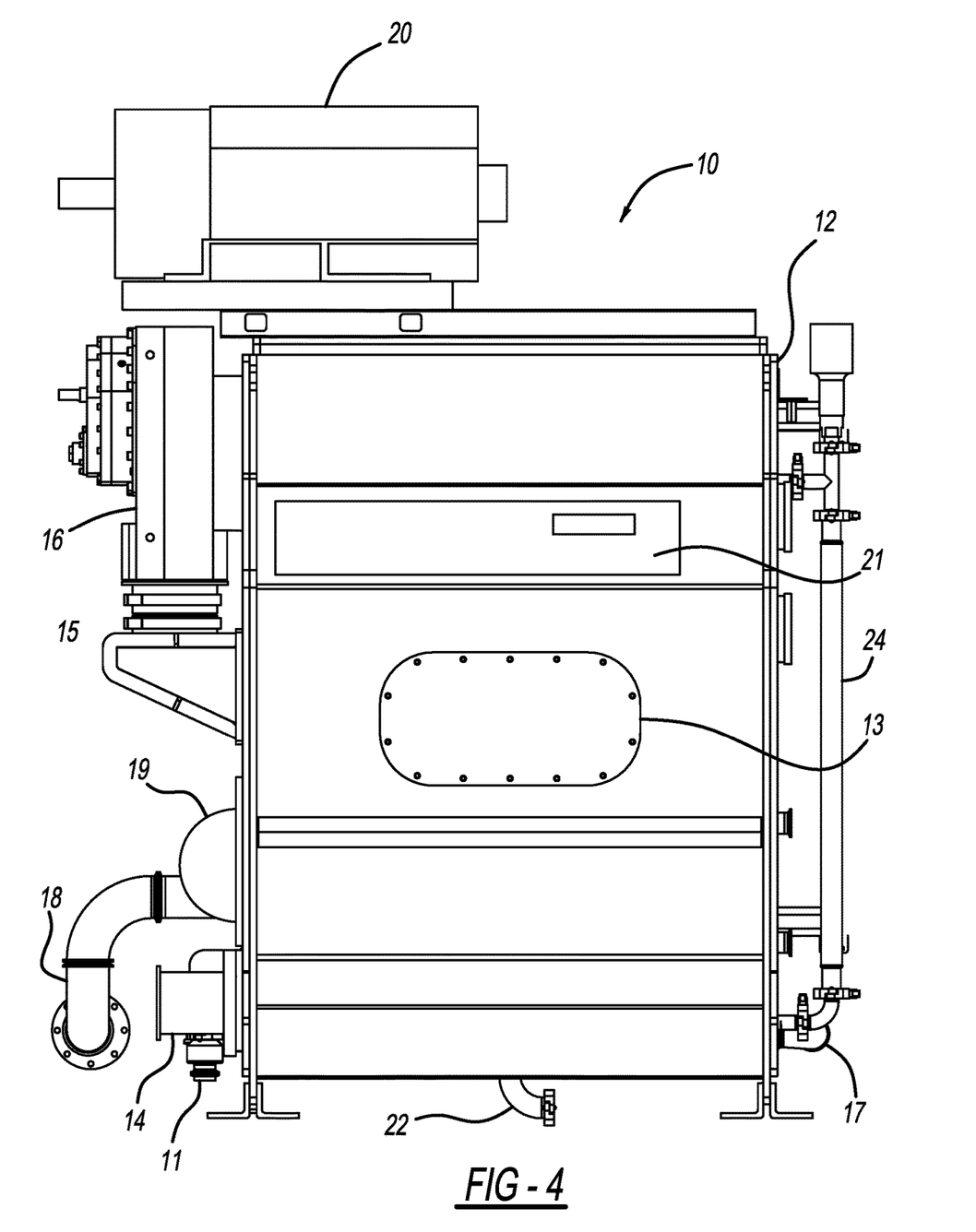
FIG. 4 shows one side of a water treatment system of the disclosure

FIG. 4 shows an example of a system 10 of the disclosure as seen from looking towards one side. This example includes tank 12 and includes pipe 11 for introducing a source water into the system. In this example, a single heating element 14 is positioned at the bottom of the tank 12. In this example a vacuum source 16, is shown, a supercharger is present. In this example, pipe 18 carries water liquid and vapor form vacuum chamber (not shown in this Figure). In addition, this example, shows drain 22, from draining wastewater from the system. In this example, there is a collector 19 that accumulates or collects water before entering pipe 18. Also, viewing window 13 is shown as well as drain 17

Figure 5:
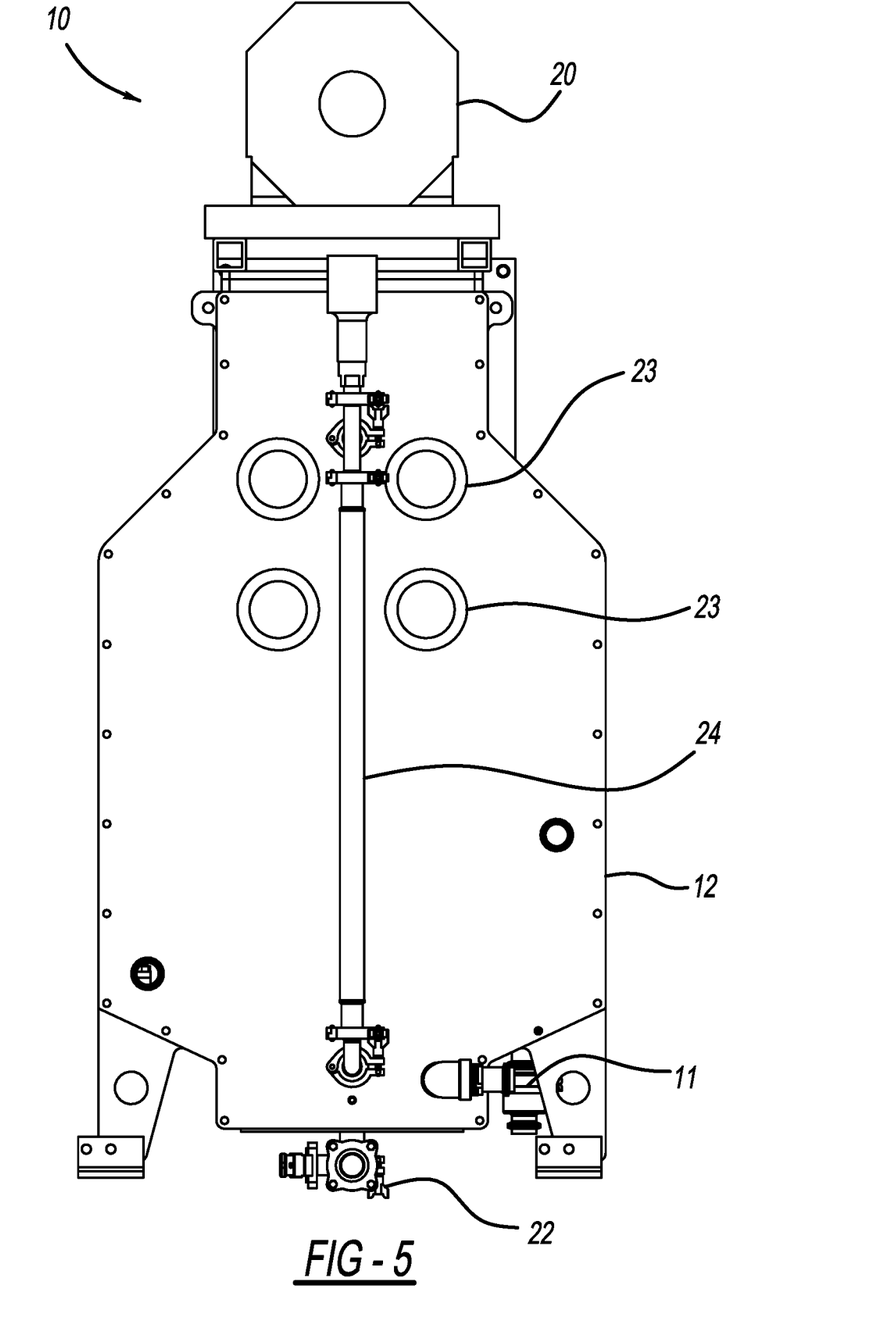
FIG. 5 shows one side of a water treatment system of the disclosure

FIG. 5 shows a view of another side of an example of a system 10 according to the disclosure. This view shows tank 12. Motor 20 is also present in this example. In addition, this example shows drain 22, for draining wastewater from the system. A visual sight 24 is also present.

Figure 6:
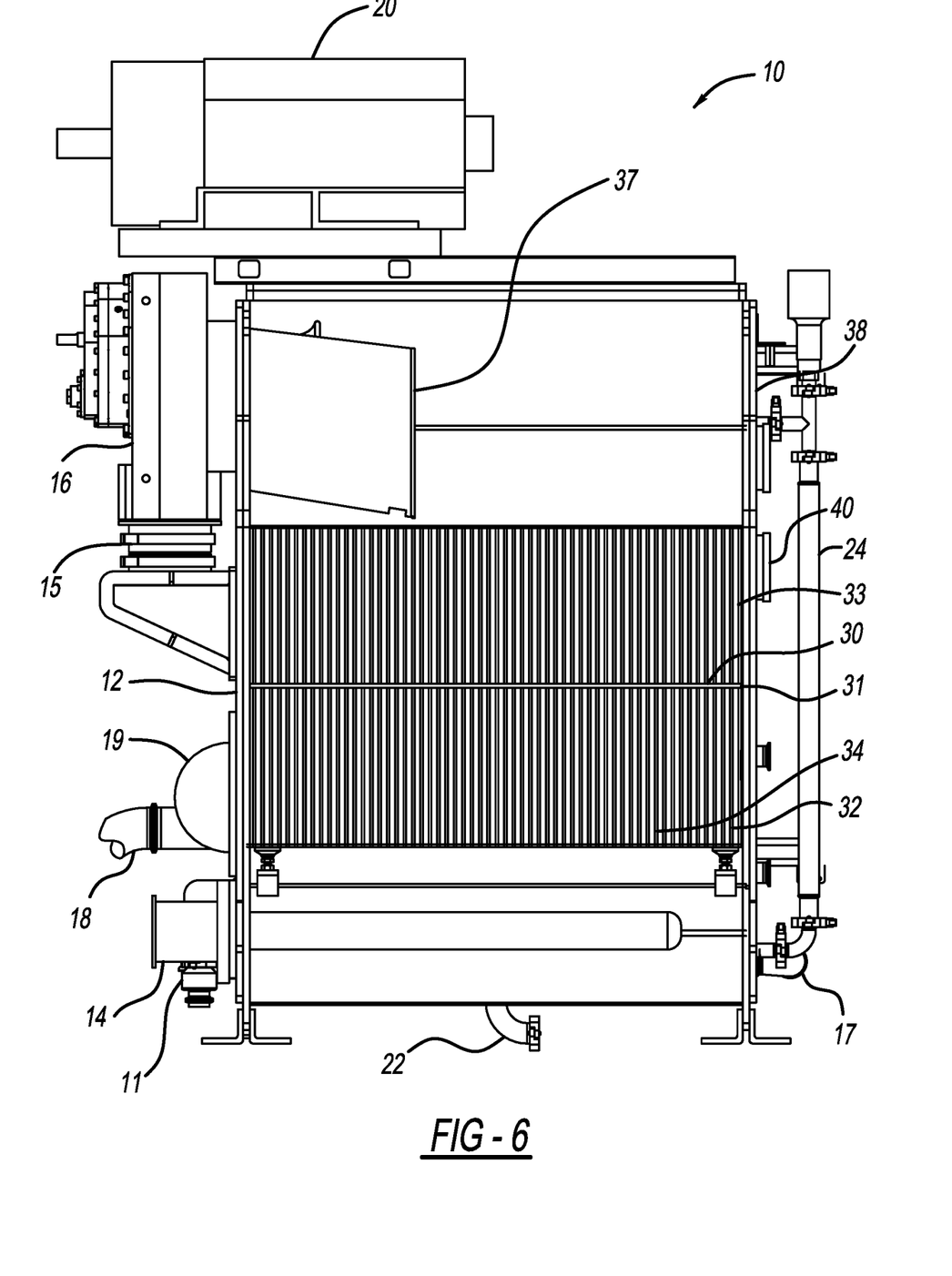
FIG. 6 shows a side view of water treatment system of the disclosure showing the interior of the water treatment system

FIG. 6 shows a view of an example of a system 10 according to the disclosure where a portion of the tank has been cutaway to show the interior of the tank 12 as seen from the side. In this example, the Figure shows the tank 12 with two chambers, 38, 40. Chamber 38 is a vacuum chamber. As shown in FIG. 6, the vacuum chamber 38 includes an intake manifold 37. Second chamber 40 holds a t least one array of heat exchangers 32. Each heat exchanger 33 extends vertically to interface with the vacuum chamber 38. Each heat exchanger 33 includes lumen 34. Block off tray 31 is shown. The Figure shows pipe 11 for introducing a source water into the system 10. In this example, a single heating element 14 is positioned at the bottom of the tank 12. In this example a vacuum source 16, is shown, a supercharger is present. In this example, pipe 15 carries water liquid and vapor form vacuum chamber (not shown in this Figure). Motor 20 is also present in this example. In addition, this example shows drain 22, for draining wastewater from the system. In this example, there is a collector 19 that accumulates or collects water before entering pipe 18.

Figure 7:
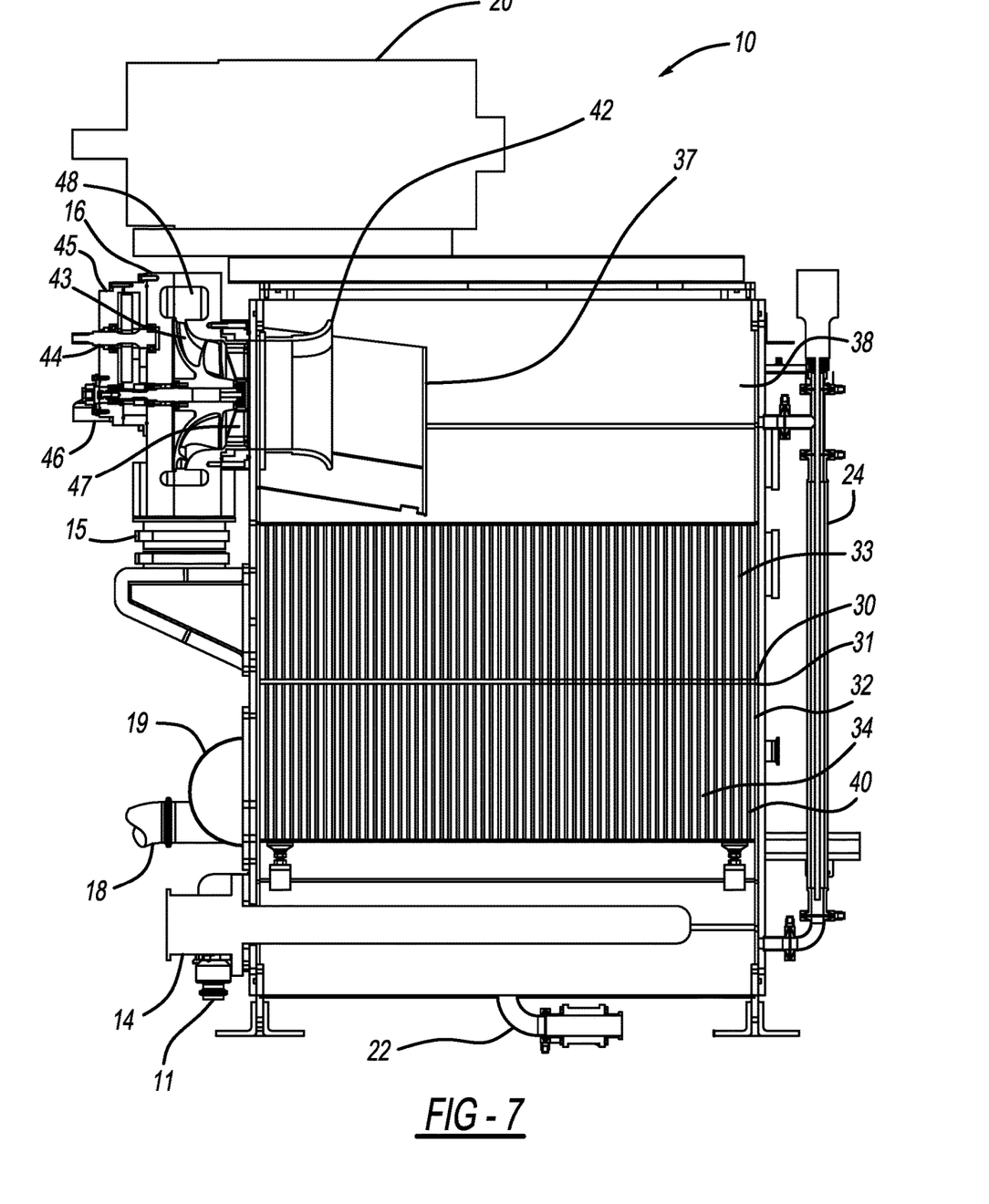
FIG. 7 shows a side view of water treatment system of the disclosure showing the interior of the water treatment system with section of the intake manifold cutaway

FIG. 7 shows a similar view to FIG. 6 except with a portion of the vacuum source cutaway. shows a view of an example of a system 10 according to the disclosure where a portion of the tank has been cutaway to show the interior of the tank 12 as seen from the side. In this example, the Figure shows the tank 12 with two chambers, 38, 40. Chamber 38 is a vacuum chamber. As shown in FIG. 6, the vacuum chamber 38 includes an intake manifold 37. Second chamber 40 holds a t least one array of heat exchangers 32. Each heat exchanger 33 extends vertically to interface with the vacuum chamber 38. Each heat exchanger 33 includes lumen 34. Block off tray 31 is shown. The Figure shows pipe 11 for introducing a source water into the system 10. In this example, a single heating element 14 is positioned at the bottom of the tank 12. In this example a vacuum source 16, is shown, a supercharger is present. In this example, pipe 15 carries water liquid and vapor from vacuum chamber. Motor 20 is also present in this example. In addition, this example shows drain 22, for draining wastewater from the system. In this example, there is a collector 19 that accumulates or collects water before entering pipe 18. The supercharger 16 includes intake stack 42, compressor turbine 43, gearbox 44, compressor Housing 45, driveshaft for impeller 46, impeller 47 and close-couple integrated compressor 48.

Figure 8:
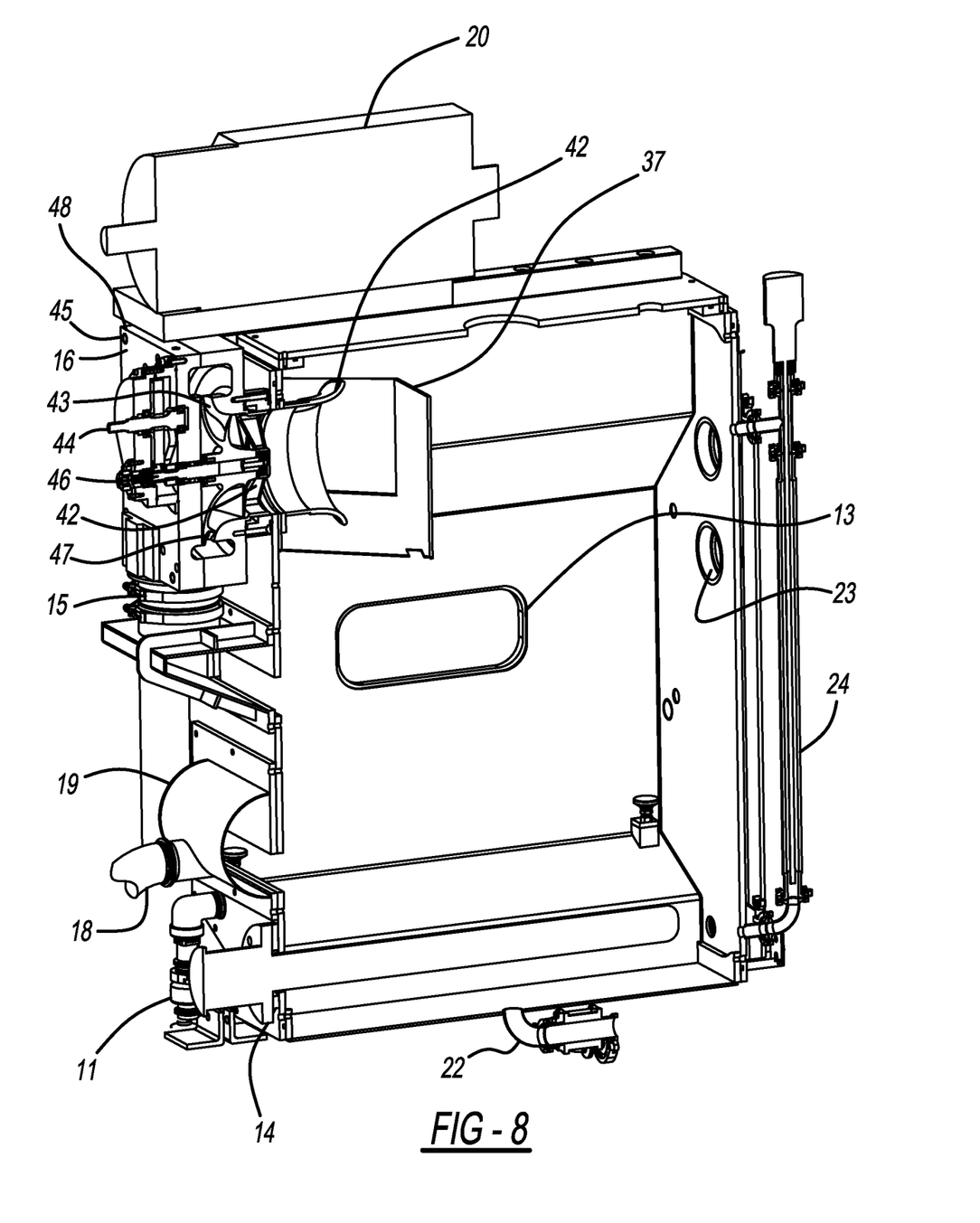
FIG. 8 shows a perspective cutaway view of a water treatment system of the disclosure showing the interior of an example of a water treatment system where an array of heat exchangers is not shown

FIG. 8 shows a similar view except with a portion of the vacuum source cutaway. shows a view of an example of a system 10 according to the disclosure where a portion of the tank has been cutaway to show the interior of the tank 12 as seen from the side. In this example, the Figure shows the tank 12 with two chambers, 38, 40. Chamber 38 is a vacuum chamber. As shown in FIG. 6, the vacuum chamber 38 includes an intake manifold. Second chamber 40 holds a t least one array of heat exchangers 32. Each heat exchanger 33 extends vertically to interface with the vacuum chamber 38. Each heat exchanger 33 includes lumen 34. The Figure shows pipe 11 for introducing a source water into the system 10. In this example, a single heating element 14 is positioned at the bottom of the tank 12. In this example a vacuum source 16, is shown, a supercharger is present. In this example, pipe 15 carries water liquid and vapor form vacuum chamber (not shown in this Figure). Motor 20 is also present in this example. In addition, this example shows drain 22, for draining wastewater from the system. In this example, there is a collector 19 that accumulates or collects water before entering pipe 18. The supercharger 16 includes intake stack 42, compressor turbine 43, gearbox 44, compressor housing 45, driveshaft for impeller 46, impeller 47 and close-couple integrated compressor 48.

EXAMPLE 1

Figure 9:
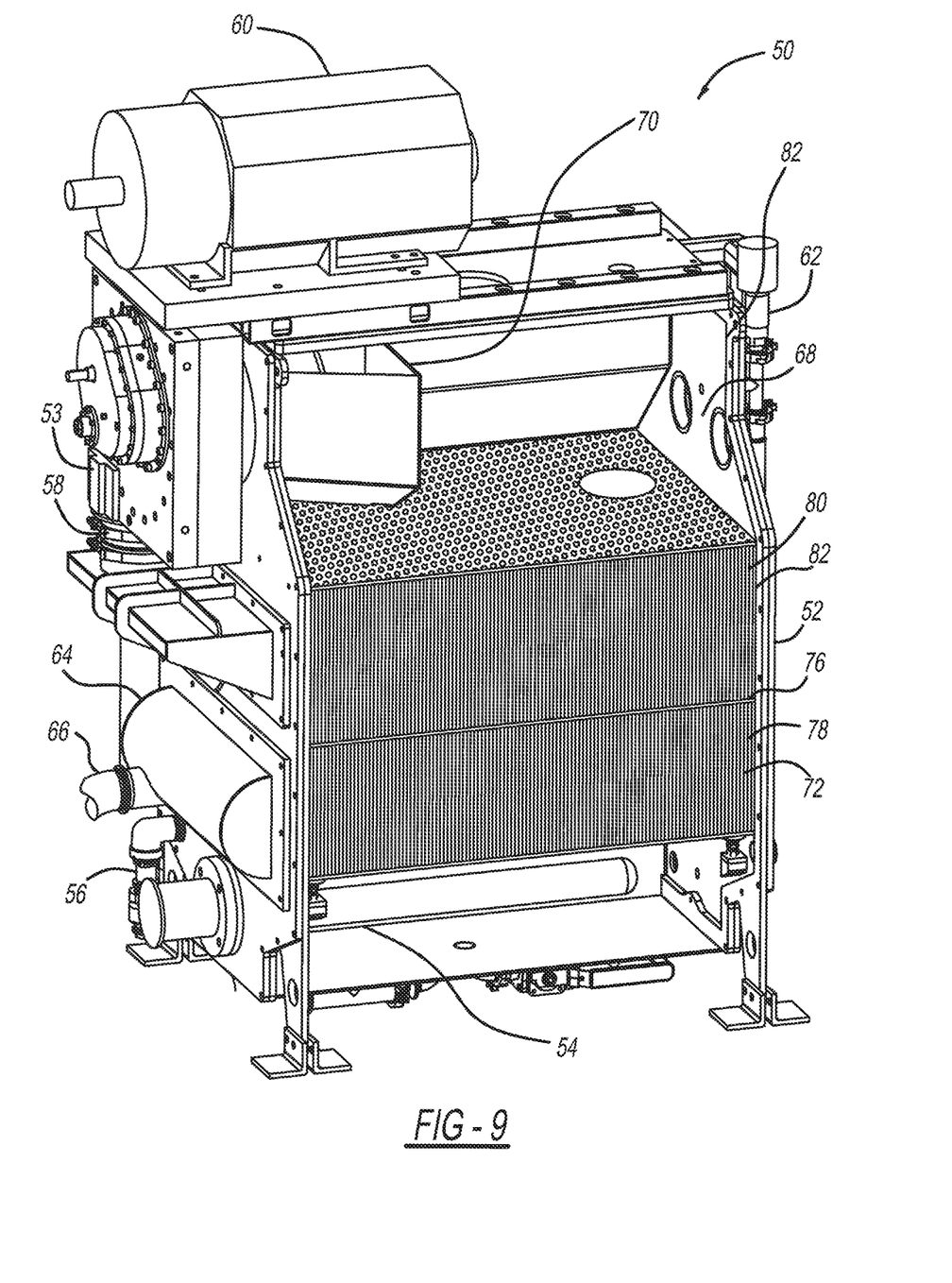
FIG. 9 shows a perspective cutaway view of a water treatment system of the disclosure showing the interior of an example of a water treatment system where an array of heat exchangers is shown

FIG. 9 shows one example of a water treatment system 50 according to the disclosure where a portion of the tank 52 has been cut away to show the internal structure of an exemplary system pf the disclosure. The system 50 includes a tank which includes chambers 68,72. Also shown is collector 64, and pipe which receives water purified by the system. According to FIG. 7, untreated water (source water) is directed into chamber 72 via pipe 56. For example, the source water may be pumped into chamber 72. In this example, a single heating element 54 is used to heat the source water. The chamber includes a single array 78 of heat exchangers 80. Source water enters the lumens 82 of the heat exchangers 80 and flows to vacuum chamber 68. A vacuum is maintained in the vacuum chamber 68 with vacuum source 53. In this example, the vacuum source is supercharger 53. The water treatment system includes a motor 60 which may be used to power the supercharger 53 or heater 54 or both the heater and vacuum source 53. In this example, electric motor 60 is shown. Drain back 81 is also shown where liquid water in the vacuum chamber may flow back to the second chamber.

Figure 10A:
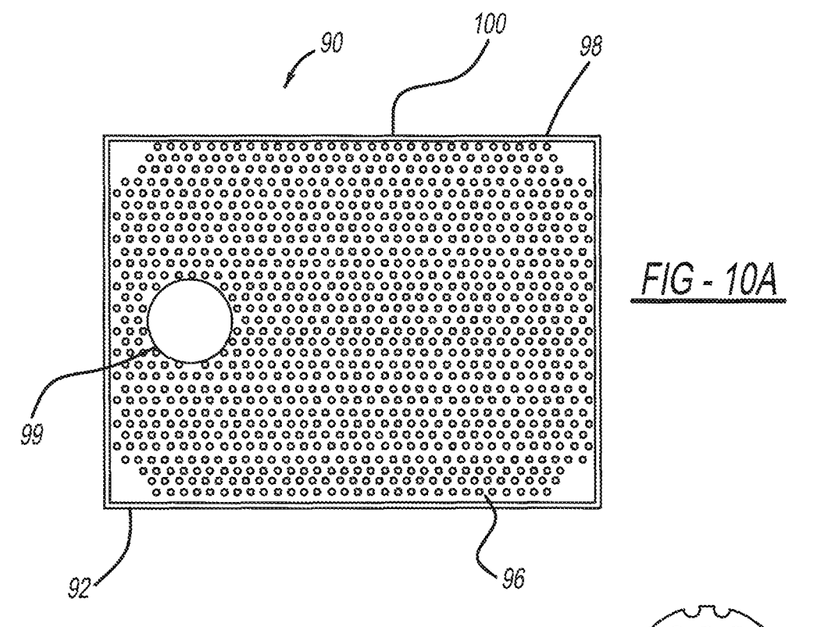
FIG. 10 shows a view of an array of heat exchangers as seen from above.
Figures 10B, 10C:
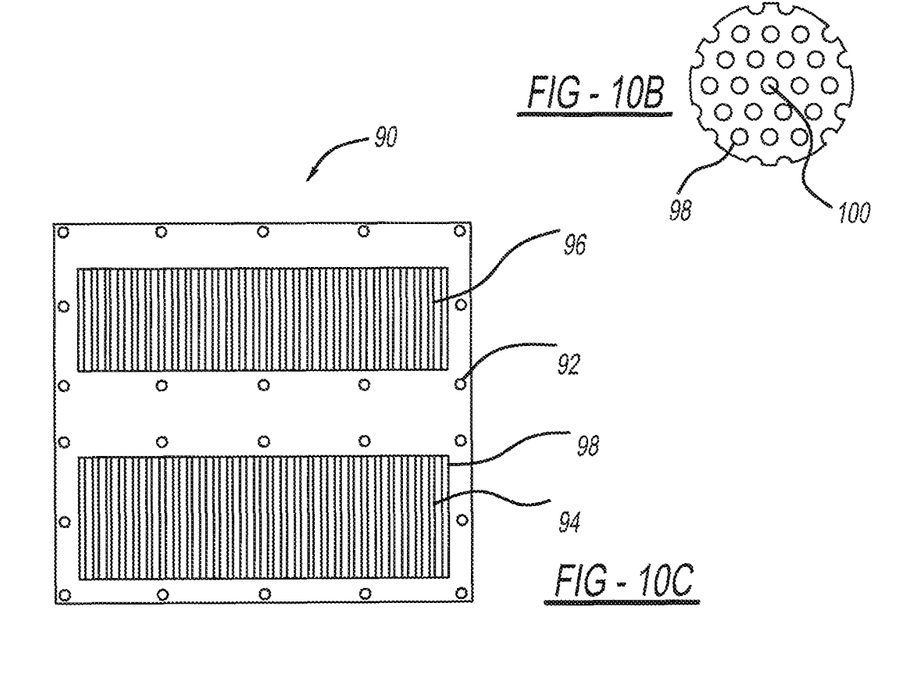

FIGS. 10a-c shows three views of an array of heat exchangers. In FIG. 8a, system 50 is shown from above with the top portion cut away. The system includes tank 52 with chamber 72. The system 50 includes an array 78 of heat exchangers 80. Each heat exchanger 80 includes lumen 82. Drain back 81 is also present. FIG. 8b is an enlargement of a portion of FIG. 8a showing a portion of the heat exchanger array 78 and each heat exchanger 80 has lumen 82. In this example, each heat exchanger is spaced equidistant apart creating a space 83 between heat exchangers. In this example, center of each heat exchanger is about one inch from the center of each adjacent heat exchanger. FIG. 8c shows a view of a portion of the system 50 as seen from the side with panels removed and showing heat exchangers 80.

Figure 11:
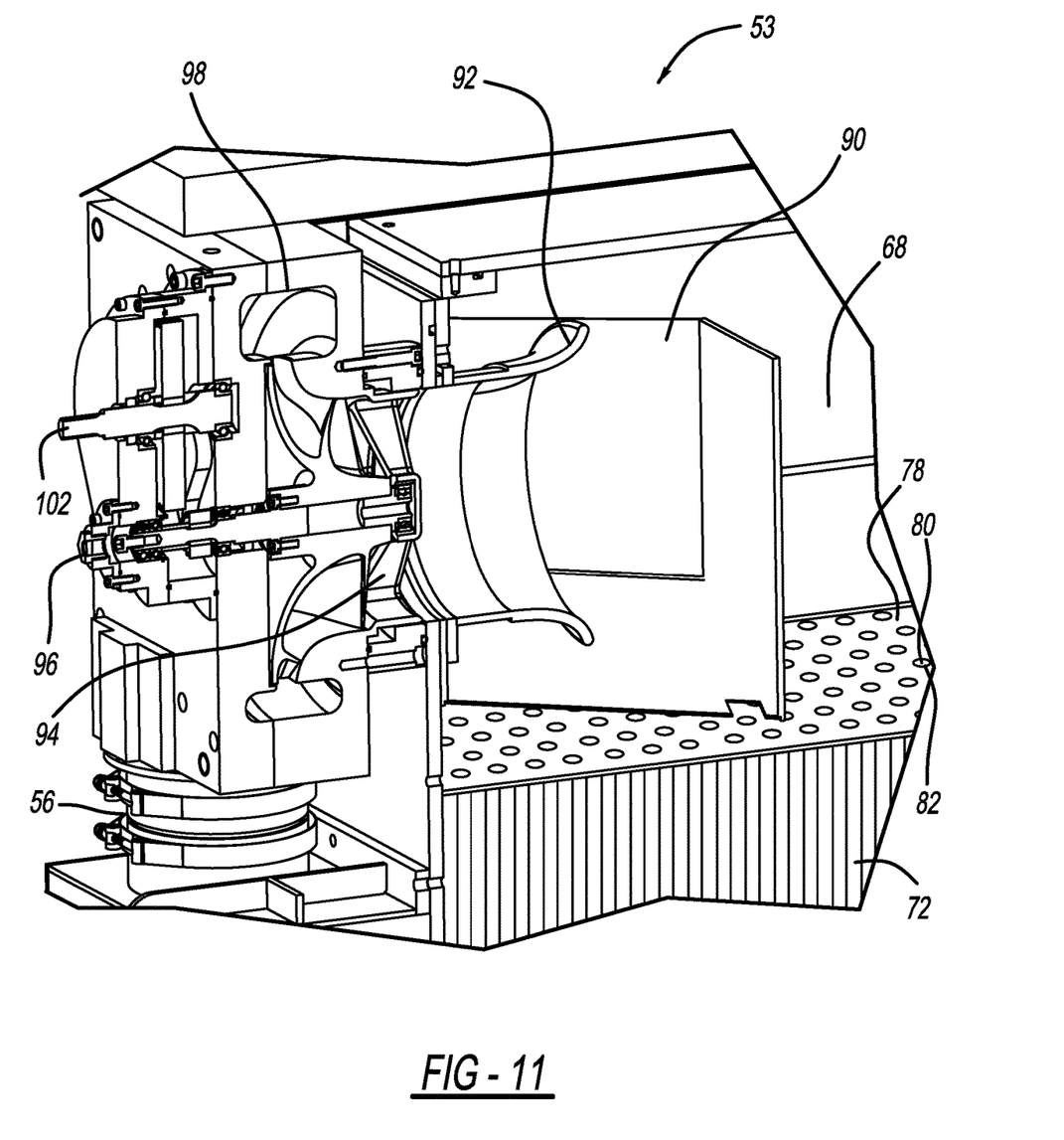
FIG. 11 shows a cutaway view of a close-up view of a vacuum source per the disclosure

FIG. 11 shows an enlarged, cutaway view of a one example of a vacuum source 53, a supercharger, and its position within a water treatment system of the disclosure. According to FIG. 9, water vapor in the vacuum chamber 68 is directed to supercharger 53 by intake manifold 90 and the water vapor enters the supercharger at intake stack 92. The supercharger includes impeller 94 with driveshaft 96, a close-coupled integrated compressor 98, and gearbox 102. Also, shown in this Figure is an enlargement of a portion of an array 78 of heat exchangers 80 with lumens 82. The supercharger increases the pressure of the vapor coming from the vacuum chamber 68, thereby heating the vapor. The vapor then passes through pipe 56 to the second chamber 72.

Referring to the Figures, pressurized water vapor re-enters chamber 72 of tank 52 through pipe 56 and fills the space 83 surrounding heat exchangers 80. The heat from the vapor is transferred to source water present in the lumens in the heat exchangers 80, facilitating the transition of liquid source water. As heat is transferred, the vapor condenses, forming the liquid product water. The liquid product water flows through tank 11 to collector 28. Product water subsequently flows through pipe 30 for storage or for use.

The invention claimed is:

1. A water treatment system, comprising;
a tank,
    said tank having a wall, said wall having an exterior surface and an interior surface;
    wherein said tank comprises:
        a vacuum chamber, comprising:
            an intake manifold, said intake manifold comprising a non-perforated plate positioned approximately vertically within said vacuum chamber;
            said intake manifold configured for collecting and directing water vapor within said vacuum chamber;
        a second chamber;
        and
        an array of tubular heat exchangers arranged in said second chamber, said heat exchangers spaced equidistant apart within said array;
        said array of heat exchangers having an upper tube plate and a lower tube plate;
        said upper and lower tube plates of said array contacting said interior surface of said wall along the entire perimeter of said upper and lower tube plates;
        wherein there is no gap between said upper and lower tube plates of said array of tubular heat exchangers and said interior surface of said wall;
        wherein said heat exchangers in said array are orientated vertically in said second chamber;
        wherein the pressure in said vacuum chamber is maintained from about 0.90 to about 0.99 atmospheres;
        said intake manifold positioned directly above said array of tubular heat exchangers;
    at least one heating element placed within and near the bottom of said second chamber;
    at least one supercharger said at least one supercharger receiving water vapor from said intake manifold;
    a pipe, said pipe flowing water from said at least one supercharger to said second chamber;
    a collector within said tank, said collector collecting product water in said tank; and
    an inlet located at the bottom of said second chamber, wherein feed water enters said tank through said inlet, and said inlet is placed such that feed water enters the tank below said array of heat exchangers and immediately adjacent to said at least one heating element.

2. The water treatment system of claim 1, wherein said vertically oriented heat exchangers within said array are from about 20 inches to about 25 inches in length.

3. The water treatment system of claim 1, wherein said system has from 800 to 1200 vertically oriented heat exchangers.

4. The water treatment system of claim 1, wherein said system has from 300 to 500 vertically oriented heat exchangers.

5. The water treatment system of claim 1, wherein said vacuum chamber comprises from about 10% to about 30% of the volume of said tank.

6. The water treatment system of claim 3, wherein said supercharger comprises: an impeller, a driveshaft, an integrated compressor, and a gearbox.

7. The water treatment system of claim 1, further comprising a block-off tray in said second chamber, said block-off tray placed approximately perpendicular to said array of tubular heat exchangers.

8. The water treatment system of claim 1, said at least one supercharger comprising an intake stack, said intake stack positioned directly above said array of tubular heat exchangers.

* * * * *